Feb. 20, 1951 F. W. LYLE 2,542,823

SHORT-WAVE BROADCAST NET

Filed Oct. 19, 1945

WITNESSES:

Leon J. Vaza.
John R. Shipman

Frederick W. Lyle.

Patented Feb. 20, 1951

2,542,823

UNITED STATES PATENT OFFICE 2,542,823

SHORT-WAVE BROADCAST NET

Frederick W. Lyle, Wilkinsburg, Pa., assignor to Westinghouse Electric Corporation, East Pittsburgh, Pa., a corporation of Pennsylvania Application October 19, 1945, Serial No. 623,373

4 Claims. (Cl. 250—15)

Figure 1:
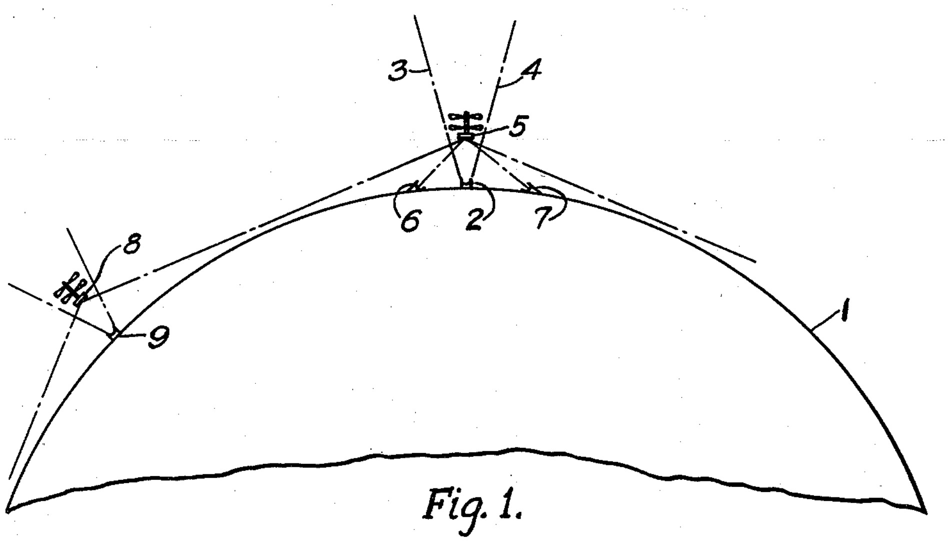

My invention relates to radio broadcasting systems, and, in particular, relates to such systems employing ultra short-wave lengths.

Electric waves of the length of those in what is known as broadcast band, i. e., having a length of the order of 300 meters have been found to follow the curvature of the earth so that they are readily received by stations a hundred or even thousands miles distant from the transmitter. However, the recent extensive exploitation of ultra short-waves having wave lengths of the order of some centimeters has shown that such waves act similarly to ordinary light waves in that substantially all their energy is propagated in straight lines, as a result of which they do not follow the curvature of the earth's surface. In consequence of this, such ultra short-waves cannot be received, by listeners located so far along the earth's surface from the transmitter than the radiating antenna of the latter is not within their line of sight. In other words, reception is limited to the horizon distance, as seen from the transmitting antenna. This fact calls for placing the transmitting antenna on some lofty structure, such as a building top or a tower; but as a practical matter, the elevation thus attainable in the desired broadcasting centers which are usually located in large cities is limited to a height of a few hundred feet. The curvature of the earth is such that the horizon distance, even with such elevations, is only of the order of 40 miles, and the area which can be served by such a short-range broadcasting station is thus limited to about that radius.

For operating broadcasting chains, it is desirable to locate broadcasting stations in large cities all over the country and in many cases to have these broadcast the same program. It is thus desirable to transmit programs from one station to another. For ordinary sound programs, telephone lines may frequently be used for this purpose but for certain types of programs, for example, television, the frequency ranges to be transmitted are so high as to make telephone cables impracticable. Attempts have been made to avoid this difficulty by transmitting the programs from station to station by radio, but the limitation of horizon distance has made it necessary to provide relay stations which pick up the program from a transmitting station and re-broadcast it to the next relay station. However, in order that the relay stations should be within line of sight of each other, it is necessary that they should be distant from each other by not over twice the horizon distance of their transmitters. Thus even when the most lofty practicable structures are used for the transmitter antennas, relay stations must be located within about 80 miles of each other. In order to relay programs from the east coast to the west coast this would obviously require a concatenation of something like 30 relay stations. Practical difficulties of the nature of distortion of the signals in passing through such a lengthy chain, and the cost of such a large number of installations make the practicability of using such systems open to question.

The number of relay stations may be reduced if it is possible to produce radiation of the radio waves from some point much higher above the earth's surface than buildings, towers or other structures rigidly attached thereto. Experience during the war in locating airplanes, ships and other objects by means of the ultra short-waves employed in radar has shown that almost all conducting bodies reflect electric waves incident upon them, and that even with the low intensity of the electromagnetic energy actually incident upon such objects, and the scattering of that energy in reflecting, the amount of energy returned from a ship or plane of ordinary size even several hundred miles away gives a satisfactorily perceptible output current in present day radio receivers.

In accordance with my invention, I obtain, in effect, the broadcasting of ultra short-radio wave programs by locating in the air above a broadcasting transmitter some object, such as an autogyro, helicopter, airplane, balloon, or the like on which I focus the radiation output of the transmitter. This object reflects a certain fraction of the energy incident upon it to receivers located on the earth within its horizon distance, and also to other receivers carried by similar elevated craft located beyond the horizon; and these receivers modulate transmitters located upon the earth's surface within their horizon. The last-mentioned transmitters focus their output on similar elevated craft located above them which again reflect a portion of the output of the second transmitter, thereby forming a link in a relaying chain. By reason of the fact that aircraft, such as I have described, may rise to heights many times greater than the top of earth-borne structures, the horizon distance of such an arrangement is far greater than that possible with earth-borne broadcasting antennas and relay systems, and the number of links in a relay chain is correspondingly reduced.

For the very highest elevations of the reflecting craft mentioned above, it is desirable to have them flying free in space. It is, however, within the purview of my invention to have them linked to earth by suitable cables which thus maintain them in a captive condition where the greatest possible reduction in the number of relay links is not found desirable.

While I have described the elevated reflecting bodies as aircraft, it will be recognized that the primary requisite of any broadcasting system is simply the provision of some reflecting material located high above the earth's surface, and the focusing thereon of radiation from a grounded transmitter. It may even be possible to employ masses of gas vapor or the like high in the atmosphere for this purpose. In fact, astonishing as it may seem at first sight, investigation has shown that the moon itself has sufficient surface area so that it may be employed as the reflected body for radio programs beamed upon it by a transmitter of size and structure quite practicable at the present day and that the signal received by reflection from the moon at any point on the earth's hemisphere from which the moon is visible at the time, will be of sufficient strength to satisfactorily operate present day radio receivers.

While the reflection from ordinary aircraft which is picked up by radar is probably almost entirely diffuse, and my invention contemplates such reflection, it is also within the purview of my invention to provide specular or other directive reflectors which shall confine most of the reflected energy to beams transmitted in particular directions, such, for example, as those in which the receiver of a sound elevated relay station is located. Reflectors properly shaped to thus deflect the beam transmitted to the aircraft from the subjacent ground transmitter can readily be designed by those skilled in the art and may be maintained in proper position on the aircraft by gyrostatic devices or the like.

While I have described the transmitters of the relay stations as located on the earth, it is within the purview of my invention to have such transmitters carried by the aircraft of the relay station itself.

One object of my invention is, accordingly, to provide a system for broadcasting radio sound or television programs, or the like which shall employ reflection from aircraft or other detached conducting objects as the source of radiation actually reaching receivers which are located on the earth's surface.

Another object of my invention is to provide a broadcasting station in which reflection from aircraft or other detached conducting objects to receivers on other elevated detached objects is employed to constitute each link of a radio relaying system.

Still another object of my invention is to provide a system for broadcasting radio or television programs or the like in which the radiant energy is first sent out by a transmitter located on the ground and thereafter reflected from an aircraft or other elevated conducting body located in the atmosphere above the transmitter.

Another object of my invention is to provide a broadcasting system for radio and television programs and the like in which the moon is used as a reflector of radiant energy modulated in accordance with the desired transmission which emanates from a transmitter located on the earth's surface to receivers located on the earth's surface.

Figure 2:
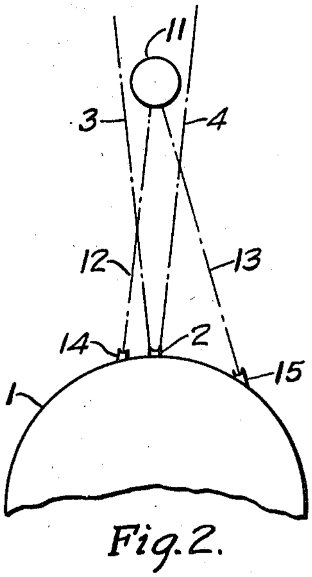

Other objects of my invention will become apparent upon reading the following description taken in connection with the drawings, in which:

Figure 1 is a schematic illustration of a broadcasting station and relay stations employing aircraft and grounded transmitter stations in accordance with my invention; and Fig. 2 is a schematic illustration of the use of radio energy reflected from the moon with receivers located on the earth's surface for broadcasting programs in accordance with my invention.

Referring in detail to Fig. 1, the curved line 1 represents the earth's surface on which is located a broadcast transmitter 2, preferably of the ultra short-wave type, i. e., using waves of a length of the order of 10 centimeters or less. The station 2 is provided, in ways too well known in the art to require detailed description here, with an oscillation generating system suitably modulated either by amplitude modulation or frequency modulation, in accordance with a sound or picture program which it is desired to broadcast or transmit to other points on the earth's surface. The antenna of the station 2 preferably comprises a paraboloidal reflector, of any type well known in the art capable of concentrating the radiant energy from the transmitter in a concentrated beam indicated by the divergent line 3—4. The amount of divergence in the beam emanating from the station 2 is exaggerated for purposes of illustration in the drawing, but may be confined to substantially as small an angle as desired, in accordance with the principles well known in the art, by properly proportioning its focal length and aperture to the dimensions of the dipole or other antenna located at its focus.

Directly above the station 2, or at least within the confines of the beam transmitted therefrom, is located an aircraft 5, or other conductive object, which, for purposes of illustration, is shown diagrammatically as an autogyro. However, balloons or other lighter-than-air type of craft, helicopters, ordinary airplanes or clouds of vapor capable of reflecting the radio waves are within the scope of my invention as substitutes for the aircraft 5, and these may be free or may be held captive to the earth by a suitable linking cable.

Radiation will be diffusely reflected from the surfaces of the aircraft 5 if the latter be of a type ordinary in the art, and some of this radiation will return to the earth at points anywhere within the horizon distant where there may be located receivers 6 and 7. While such receivers may employ ordinary non-directive receiving antennas, it will be preferable to employ paraboloidal receiving reflectors too well known in the art to require extended description here. The receivers 6 and 7 may be those belonging to members of the ordinary home-radio or television audience, or they may be receivers used to modulate the output of local broadcasting stations of ordinary type.

Where it is desired to relay the output of the broadcasting station 2 to some distant point, an elevated conductive object 8, of one of the general types mentioned in connection with aircraft 5, may be located somewhere beyond the horizon from aircraft 5 at a sufficient elevation so that it is within line of sight of aircraft 5. For example, if the elevations of the aircrafts 5 and 8 are the same, the aircraft 8 may be positioned approximately twice the horizon distance from aircraft 5.

The aircraft 8 may carry a suitable receiver which may be made to modulate a small transmitter capable of relaying the transmitted signal to a station 9 located on the earth's surface somewhere within the horizon distance from the aircraft 8. For example, the station 9 may be directly below the aircraft 8 where so desirable for certain purposes. The station 9 comprises, in addition to a suitable receiver, a transmitter of the same general type as that described in connection with broadcasting station 2, which transmits a beam of radiation onto the surface of the aircraft 8. This radiation will again be diffusely reflected and may be received anywhere within the horizon distance of the aircraft 8 by auditor receivers, or may be received by a second relay aircraft (not shown) located in relation to the aircraft 8 in the similar way to that in which the relay aircraft 8 is located relative to the aircraft 5.

Where the aircraft 8 is one of the captive type, it may be desirable for the output of the receiver on aircraft 8 to be transmitted to the station 9 by suitable conductors carried on the tying-cable.

It may be desirable in certain instances where no auditors are so positioned as to make diffuse reflection of radio from the aircrafts 5 or 8 desirable to provide the aircraft 5 or 8 with suitable shaped specular or other directive reflecting surfaces upon which the beam from the transmitters 2 and 9 are incident. Such reflecting surfaces may be shaped to reflect the incident beam in the form of an outgoing beam directed toward a desired receiver for the same. For example, the reflector on aircraft 5 may transmit the radiant energy in a beam focused upon the aircraft 8. Alternatively, the shaped reflector on the aircraft 5 may be used to beam a certain portion of the incident energy directly to the receivers 6 or 7 when it is desired to do so. Moreover the provision of special surfaces particularly adapted to diffusely reflect radiation about the aircraft 5 and 8 are likewise contemplated by this invention.

Referring in particular to Fig. 2, investigation has shown it to be entirely feasible to broadcast radio and television programs by short-wave by employing the moon as a diffuse reflector. In Fig. 2, the curve 1 represents a portion of the earth's surface having a transmitting station 2 suitably located on its surface. The transmitting station 2 is of the same general type described in connection with Fig. 1, and is designed to transmit a concentrated beam of radiant energy and direct it toward the surface of the moon 11. It is, of course, desirable that the beam from the transmitter 2 shall be so proportioned that nearly all of its radiated energy strikes the moon's surface.

The surface of the moon will diffuse the radiant energy incident upon it and a certain fraction of this radiated energy, will, as illustrated by the broken lines 12, 13, be reflected to receivers 14, 15 which may be located anywhere upon that hemisphere of the earth's surface from which the moon is visible at the time. Investigation has shown that by employing transmitters, reflectors and receivers of a type now conventional in the radio art, sufficient reflected energy will be received at any point, such as 14 or 15, to produce satisfactorily audible signals. By modulating the transmission from the transmitter 2 in accordance with any desired sound or television program, the latter may be reproduced on the receivers located at such points as 14 and 15 with satisfactory audibility.

I claim as my invention:

1. A radio program broadcasting system comprising a transmitter located on the earth's surface and radiating ultra short-wave program-modulated radiant energy, a first body of solid reflecting material unsupported from the earth's surface located above said transmitter and in the path of said energy, a second body of solid reflecting material elevated sufficiently above another point on the earth's surface to be within line-of-sight of the first-mentioned body, a receiver associated with the second-mentioned reflecting material for receiving said radiant energy, and means for modulating the output of a second transmitter by the output of said receiver.

2. A radio program broadcasting system comprising a transmitter located on the earth's surface and radiating an ultra short-wave program-modulated radiant energy, a body of solid reflecting material unsupported from the earth's surface, located above said transmitter and in the path of said energy, a second body of reflecting material elevated sufficiently above another point on the earth's surface to be within line-of-sight of the first-mentioned body, a receiver associated with the second-mentioned reflecting material for receiving said radiant energy, and means for modulating the output of a second transmitter located on the earth's surface within the horizon distance of the second-mentioned reflecting material by the output of said receiver.

3. A radio program broadcasting system comprising a transmitter located on the earth's surface and radiating ultra short-wave program-modulated radiant energy in the form of a beam, means for focussing said beam upon a solid body of reflecting material positioned above the earth's surface and free to move relative thereto, a second body of reflecting material located above the earth's surface within line-of-sight of the first-mentioned reflecting material, a receiver for said radiant energy associated with said second body of reflecting material, and means for modulating the output of a second transmitter in accordance with the output of said receiver.

4. A radio program broadcasting system comprising a first transmitter located on the earth's surface and radiating ultra short-wave program-modulated radiant energy in the form of a beam, means for focussing said beam upon a solid body of reflecting material which is moving relative to said surface, a second body of solid reflecting material located above the earth's surface within line-of-sight of the first-mentioned reflecting material, a receiver for said radiant energy associated with said second body of reflecting material, and means for modulating the output of a second transmitter, by the output of said receiver, said second transmitter being located on the earth's surface within the horizon distance of said second body of reflecting material.

FREDERICK W. LYLE.

REFERENCES CITED

The following references are of record in the file of this patent:

UNITED STATES PATENTS

| Number | Name | Date |
|---|---|---|
| 806,052 | Blackmore | Nov. 28, 1905 |
| 1,927,394 | Darbord et al. | Sept. 19, 1933 |
| 1,939,345 | Gerth et al. | Dec. 12, 1933 |

(Other references on following page)

UNITED STATES PATENTS

| Number | Name | Date |
|---|---|---|
| 1,981,884 | Taylor et al. | Nov. 27, 1934 |
| 2,042,302 | Frantz et al. | May 26, 1936 |
| 2,177,061 | Gerhard | Oct. 24, 1939 |

OTHER REFERENCES

"New Radio Concept Would End Chains," The New York Times, August 10, 1945, pages 17, column 1 and 18, column 2.

"Next Is Stratovision," New York Herald Tribune, August 10, 1945, page 1, column 2 and 3, and 15, column 2 and 3.

"Westinghouse Proposes Flying Tele-FM Stations," Electronic Industries, Sept. 1945, pages 94, 95, 234 and 238.

"Stratovision," Radio-Craft, October 1945, pages 17 and 45.

"Extra-Terrestrial Relays," Wireless World, October 1945, pages 305 to 308.

"Can We Radio the Planets?" Radio News, February 1927, pages 946, 947, 1045, 1046 and 1047.

Zworykin Extends Range of Ultra Short Waves," Radio and Television, January 1939, page 525.